United States Patent [19]
Hocquet et al.

[11] Patent Number: 5,959,216
[45] Date of Patent: Sep. 28, 1999

[54] METHOD OF CONDITIONING A FLUID FLOW, AND A FLUID FLOW CONDITIONER

[75] Inventors: Philippe Hocquet, Vanves; Andrew John Parry, Bourg la Reine, both of France

[73] Assignee: Schlumberger Industries, S.A., Montrouge, France

[21] Appl. No.: 08/903,294

[22] Filed: Jul. 30, 1997

[51] Int. Cl.[6] .................................................... G01F 1/20
[52] U.S. Cl. ............................................................ 73/861.19
[58] Field of Search ........................................... 73/861.19

[56] References Cited

U.S. PATENT DOCUMENTS

| | | | |
|---|---|---|---|
| 4,976,155 | 12/1990 | Challandes | 73/861.19 |
| 5,218,872 | 6/1993 | Hattori et al. | 73/861.19 |
| 5,339,695 | 8/1994 | Kang et al. | 73/861.19 |
| 5,363,704 | 11/1994 | Huang | 73/861.19 |
| 5,396,809 | 3/1995 | Huang | 73/861.19 |

*Primary Examiner*—Richard Chilcot
*Assistant Examiner*—Jewel V. Thompson
*Attorney, Agent, or Firm*—Leonard Pojunas

[57] ABSTRACT

A method of conditioning a fluid flow from a first area to a second area downstream from the first area. The flow coming from the first area is directed in a longitudinal direction. The cross-section of flow is increased, and the flow is split by means of an impact surface substantially perpendicularly to the longitudinal flow direction. The split is caused to flow symmetrically relative to the longitudinal flow direction over a predetermined distance from the splitting to the second area without reducing the rate. The split flow is accelerated over at least a portion of said predetermined distance. The flow is mixed to achieve a conditioned fluid flow in the second area.

33 Claims, 10 Drawing Sheets

METHOD OF CONDITIONING A FLUID FLOW, AND A FLUID FLOW CONDITIONER

The present invention relates to a method of conditioning a fluid flow from a first zone towards a second zone situated downstream from said first zone, and also to a fluid flow conditioner for placing upstream from a device for determining a volume-related quantity of the fluid relative to the flow direction of said fluid.

It is known that a flow conditioner can be placed upstream from a device for determining a volume-related quantity of a flowing fluid which includes a measurement block, the conditioner serving to make the distribution of speeds within said flow more uniform and to destroy turbulent structures present therein so that the flow presents uniform characteristics at the inlet of the device regardless of the conditions of flow and the rate of flow at the inlet to the conditioner.

A flow conditioner is particularly recommended when the device is of the static type, i.e. when the measurement block of said device does not make use of moving parts of the kind to be found in traditional turbine, spinner, or membrane devices. Thus, it is often essential to have a flow conditioner, whenever the measurement block is a fluidic oscillator or whenever the measurement block comprises a measurement channel and at least two ultrasound transducers defining between them an ultrasound measurement path extending along at least a portion of said measurement channel.

Such devices are very sensitive to disturbances generated upstream in the fluid flow, e.g. by a valve or by a bend, and giving rise to a rotational component in the speeds propagated by the flow, in turn giving rise to measurements having a high error content.

British application No. 2 235 064 discloses a flow conditioner in the form of a plate placed in a duct upstream from the measurement block and provided on its surface that faces the flow with perforations having axes parallel to said flow. Such a conditioner destroys the turbulent structures present in the flow and makes the speed distribution of the flow more uniform.

Nevertheless, that type of conditioner suffers from the drawback of increasing head losses, and that is troublesome when it is desired to determine a volume-related quantity of fluid with minimum headloss in ducts of small diameter.

In addition, that type of conditioner nevertheless generates turbulence downstream from the flow conditioner, thereby disturbing determination of the volume-related quantity of fluid, and also it clogs up over time. Conditioner clogging inevitably leads to a drop in its performance and to a rise in headlosses.

In addition, in order to destroy effectively the turbulent structures present in the fluid flow, that type of conditioner must be placed at a sufficient distance upstream from the measurement block, and that can give rise to problems of compactness.

Another type of flow conditioner is known which is placed upstream from a fluidic oscillator, as described in European patent application No. 0 503 462, in which the fluidic oscillator is disposed symmetrically about a longitudinal plane of symmetry.

That patent application describes a measurement device comprising a first chamber of large dimensions into which the fluid flow opens out perpendicularly to the plane of symmetry while simultaneously presenting the said flow with a sudden increase in flow section.

The device also includes a flow outlet in the form of a converging portion which is placed in the longitudinal plane of symmetry and which communicates with a second chamber leading to the fluidic oscillator.

The flow conditioner includes a semicircular wall which is disposed symmetrically about the longitudinal plane of symmetry and which has its concave side facing the converging portion, and it also includes walls on either side of the converging portion With its walls on either side of the converging portion, the flow conditioner forms two passages that are symmetrical about the longitudinal plane of symmetry and that are constituted by respective converging first portions and diverging second portions in which the fluid flow is caused to recirculate. Each of the passages receives a fraction of the fluid flow, accelerates it, and then slows it down prior to the two fractions being mixed together again and penetrating into the converging portion.

Since the flow inlet into the first chamber is offset relative to the longitudinal plane of symmetry, the flow opening out into said chamber distributes asymmetrically about the longitudinal plane of symmetry. At high flow rates, such asymmetrical flow can still be present within the fluidic oscillator, thereby altering its frequency of oscillation and thus having an effect on the measured volume-related quantity of the fluid. Furthermore, the presence of a diverging portion in each of the passages generates additional headloss in the flow conditioner and that can be troublesome in certain applications.

The present invention thus seeks to condition a flow of fluid going from a first zone towards a second zone situated downstream from said first zone while generating little headloss and giving rise to flow characteristics at the inlet of the second zone that are independent of the flow characteristics in the first zone.

The present invention thus provides a method of conditioning a fluid flow from a first zone towards a second zone situated downstream from said first zone, characterized in that said method consists in:

directing said flow coming from the first zone into a longitudinal direction;

subjecting said flow to an increase in flow section;

fractioning said flow on an, "impact" surface extending substantially transversely to the longitudinal direction of the flow;

channeling the fractioned flow symmetrically about the longitudinal direction of the flow over a determined length from the fractioning location to the second zone, and without slowing the flow down;

accelerating said fractioned flow over at least a portion of said determined length; and mixing the flow in order to obtain a conditioned fluid flow in the second zone.

According to the invention, the longitudinally directed fluid flow is subjected to an increase in flow section and is split into fractions on the impact surface which is substantially perpendicular to said direction, thereby reducing the mean speed of said flow in the longitudinal direction to zero, and transforming it into transverse components in application of the principle of conservation of momentum.

In addition, the method of the invention creates a steady distribution of the fractioned flow so as to avoid any oscillation in the flow. Thus, fractioning serves to destroy the turbulent structures present in the flow and, in general, makes it possible to control the momentum of the flow.

The fractioned fluid flow is then channeled symmetrically relative to the longitudinal flow direction over a determined length from the location of the fractioning to the second zone. Over at least a portion of said determined length, the flow is accelerated in symmetrical manner about the longitudinal direction of the flow prior to fractioning in order to obtain a more uniform speed distribution in said flow fraction. It is particularly important for the fractioned flow to be channeled without being slowed down. Such slowing down could, for example, occur with an increase in flow section or with an obstacle on the path of said flow.

Such slowing down would cause headloss and would alter the speed distribution in the flow fraction, thereby reducing the effectiveness of fluid conditioning. The fractioned and accelerated flow then penetrates into a zone situated immediately upstream from the second zone and having the function of mixing together said fractioned flow. This zone makes it possible to adjust the local level of turbulence and the mean speed of each flow fraction to values that are stable, prior to the conditioned flow penetrating into said second zone. Here again, it is very important to ensure that the flow is not slowed down during mixing.

According to a characteristic of the method, each fraction of the flow can be accelerated immediately downstream from the fractioning zone over a portion of the determined length of the channeling step or over its entire length.

According to another advantageous characteristic of the method, the longitudinally-directed fluid flow is subjected to a sudden increase in flow section, thereby having the effect of generating a fluid flow recirculation phenomenon at said increase in flow section, immediately downstream from the fractioning zone.

This recirculation phenomenon takes a fraction of the momentum of the fluid flow prior to fractioning on the impact surface, thereby contributing to transforming in controlled manner the dynamics of said flow present at its periphery.

Also, it is advantageous simultaneously to accelerate each flow fraction in contact with this phenomenon of flow recirculation.

When the fluid flow recirculation phenomenon is caused to begin at the increase in flow section, the simultaneous acceleration of each flow fraction in contact with said recirculation phenomenon makes it possible to stabilize said phenomenon.

During the channeling step, provision is made to pass each flow fraction through a bend situated downstream from the fractioning zone.

Each flow fraction at the bend can thus be accelerated simultaneously.

It is also possible to improve the effectiveness of the conditioning by accelerating the fluid flow during the mixing step. The fluid conditioning of the invention has the effect of imparting characteristics to the flow penetrating into the second zone that are independent of those of the flow in the first zone.

The invention also provides a fluid flow conditioner comprising an inlet and an outlet for the fluid flow, characterized in that said conditioner is symmetrical about a longitudinal plane of symmetry P in which said inlet and outlet are contained, and in that said conditioner comprises:

a chamber connected to said inlet and partially defined by an impact surface extending in a direction substantially contained in a transverse plane and against which the flow is fractioned, said impact surface being situated facing said inlet;

channeling means for channeling the fractioned flow to the outlet of the conditioner and including at least two passages for bringing the fractioned flow to a mixing zone for the fractioned flow situated immediately upstream from said outlet, said channeling means comprising at least one converging portion and not slowing down the flow; and the distance between the inlet of the conditioner and the impact surface, and the size of the section offered to the flow in the channeling means compared with the size of the inlet section of the conditioner being selected in such a manner that the fluid flow has a longitudinal direction until it meets said impact surface and does not oscillate in the chamber. This conditioner operates in the manner given above.

This conditioner makes it possible to destroy turbulent structures and to eliminate non-uniformities present in the speed distribution of the flow.

Since the flow conditioner of the invention is symmetrical about the longitudinal plane of symmetry, and because of the presence of the mixing zone, each flow fraction is subjected to headloss that is more or less equal and is therefore shared in substantially equal manner in each passage, thereby contributing to obtaining uniform speed distribution in each flow fraction.

In addition, the flow conditioner of the invention is the seat of controlled headloss that is small compared with prior art conditioners.

Given the fact that the channeling means comprise at least one converging portion and do not slow down the flow to the outlet of the conditioner, i.e. the fractioned flow is at least accelerated over a portion of the length of said channeling means, it is possible to obtain within the flow a speed distribution that is more uniform in the downstream direction.

The fact of the flow being accelerated contributes firstly to the effectiveness of the conditioner and secondly to its compactness.

It is also possible to make provision for the flow to be accelerated continuously along the entire length of the channeling means.

According to a characteristic of the invention, the converging portion may be connected directly into the chamber into which the flow opens out, thereby making it possible to increase the fractioned flow speed immediately after fractioning thereof The channeling means comprise a portion of constant flow section disposed downstream from the converging portion and serving to channel each flow fraction towards the outlet of the conditioner.

According to another characteristic of the invention, the channeling means of the flow conditioner comprise a converging portion which is not directly connected to the chamber. This converging portion may equally well be added to that which is directly connected to the chamber for the purpose of improving the distribution of the flow zone over which the flow fraction is accelerated.

The fractioned flow channeling means include at least one bend serving, in particular, to direct the corresponding flow fraction towards the outlet of the conditioner.

It is advantageous to provide for the bend to be included in a converging portion in order to increase the compactness of the flow conditioner of the invention.

By way of example, the channeling means may include two or more bends with oppositely-directed concave sides.

The configuration including two successive bends imparts a structure that is more compact than when using a single bend only.

Advantageously, provision may be made for the chamber imparting a sudden increase in flow section to the fluid coming from the inlet, thereby having the effect of generating a fluid flow recirculation phenomenon at said increase in flow section, as explained above.

This characteristic increases the effectiveness of the flow conditioner of the invention.

According to other characteristics of the invention:

the distance between the inlet of the conditioner and the impact surface is less than four times the diameter of said inlet, and the minimum flow section of the channeling means is less than the section of said inlet;

the minimum flow section of the channeling means is equal to at least twice the flow section of the outlet of said conditioner;

the dimension between the inlet and the outlet of said conditioner lying in the range one to five times the flow diameter of the inlet of the conditioner;

the transverse dimension of the conditioner lies in the range 1.5 to 5 times the flow diameter of the inlet of the conditioner, this dimension making it possible to stabilize the flow recirculation phenomenon that begins at the sudden increase in flow section;

the conditioner comprises an enclosure interconnecting the inlet and the outlet of said conditioner, and an obstacle disposed in the middle of said enclosure;

the obstacle is provided with a front surface which forms at least a part of the impact surface of said conditioner; and the inlet and the outlet of said conditioner are in alignment.

In an embodiment of the invention:

the enclosure and the obstacle respectively present an inside surface and an outside surface forming between them two lateral passages surrounding said obstacle;

the obstacle is formed by a central body and two lateral portions extending from said central body mainly in a direction that is transverse to the longitudinal plane of symmetry P;

each lateral portion co-operates with the facing portion of the enclosure to define a first bend for the corresponding flow fraction, and also a converging portion that is directly connected to the chamber and that includes said bend;

each lateral portion is in the form of a lobe;

each lobe is flared in shape going away from the central body and terminates in an end having an outside surface that is convex;

the convex outside surface has a profile that is circular in shape of radius R1 lying in the range 0.1 to 3.5 times the diameter of the inlet of the conditioner;

the portion of the enclosure facing the convex outside surface of each lateral portion has an inside surface that is concave;

the concave inside surface has a profile of circular shape with radius R2 lying in the range 0.3 to 4 times the diameter of the inlet of the conditioner;

the circles of respective radii R1 and R2 have respective centers O1 and O2, said centers O1 and O2 being situated on a straight line parallel to the longitudinal plane of symmetry P and perpendicular to the front surface of the obstacle, and being spaced apart from each other by a distance that is less than the diameter of the inlet of the conditioner;

the central body has a rear portion which co-operates with the facing portion of the enclosure to define a second bend for the corresponding flow fraction; and the rear portion is V-shaped.

In another embodiment of the invention, the conditioner is circularly symmetrical about the longitudinal direction of the fluid flow and in which the enclosure and the obstacle respectively present an inside surface and an outside surface which together form a single passage surrounding said obstacle, at least two elements being disposed between said surfaces at a certain distance from the inlet in order to separate a portion of said passage into two passages of the same dimensions.

The conditioner of the invention can be applied equally well to gas or to water, and indeed to a fluid such as motor vehicle fuel, for example.

The invention also provides a device for determining a volume-related quantity of a flowing fluid, the device comprising a measurement block and a flow conditioner as defined above disposed upstream from said measurement block in the fluid flow direction. The measurement block is disposed in line with the flow conditioner.

According to particular characteristics of the device:

the measurement block is a fluidic oscillator; and the measurement block comprises at least one measurement channel in the form of a parallelepiped and at least two ultrasound transducers defining an ultrasound measurement path between them extending along at least a portion of the measurement channel.

Other characteristics and advantages appear from the following description given by way of non-limiting example and made with reference to the accompanying drawings, in which.

Figure 2:
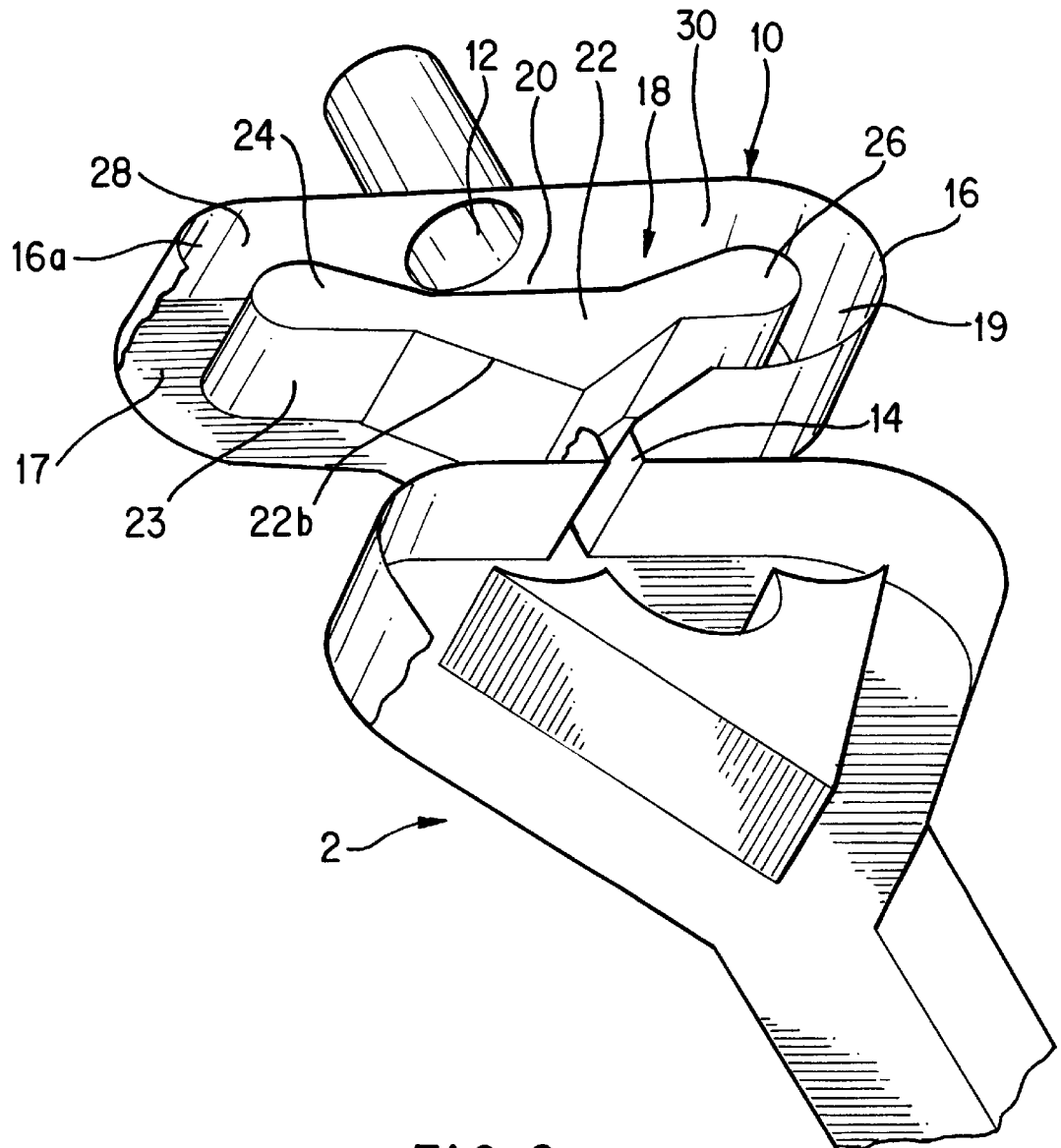
FIG. 2 is a diagrammatic perspective view of the flow conditioner shown in FIG. 1 and disposed upstream from a prior art fluidic oscillator.
Figure 9:
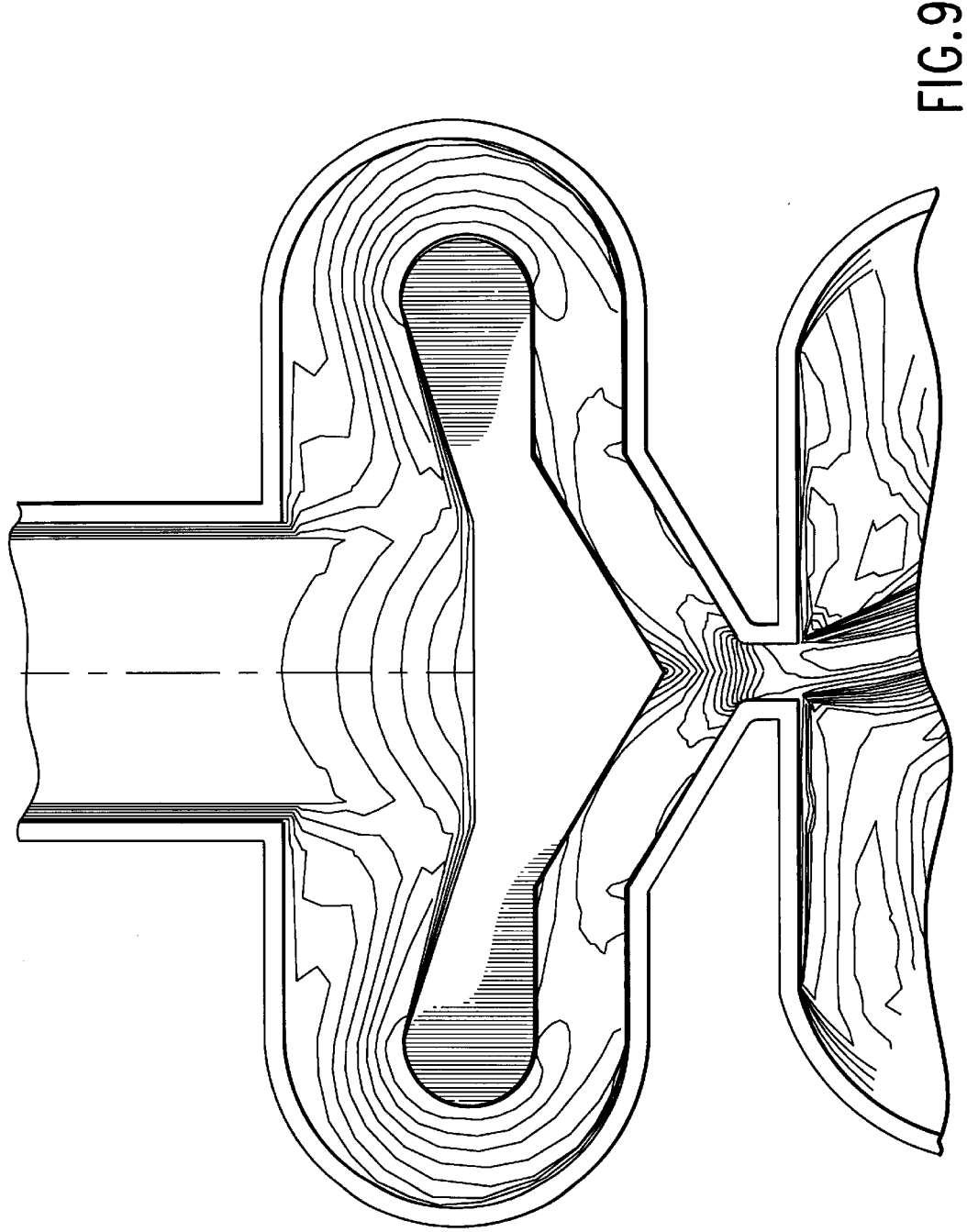
FIG. 9 is a diagrammatic plan view of the flow conditioner shown in FIG. 1 and on which the flow speed distribution field is shown for the situation when the flow at the inlet to the conditioner has a uniform speed distribution profile.
Figure 10:
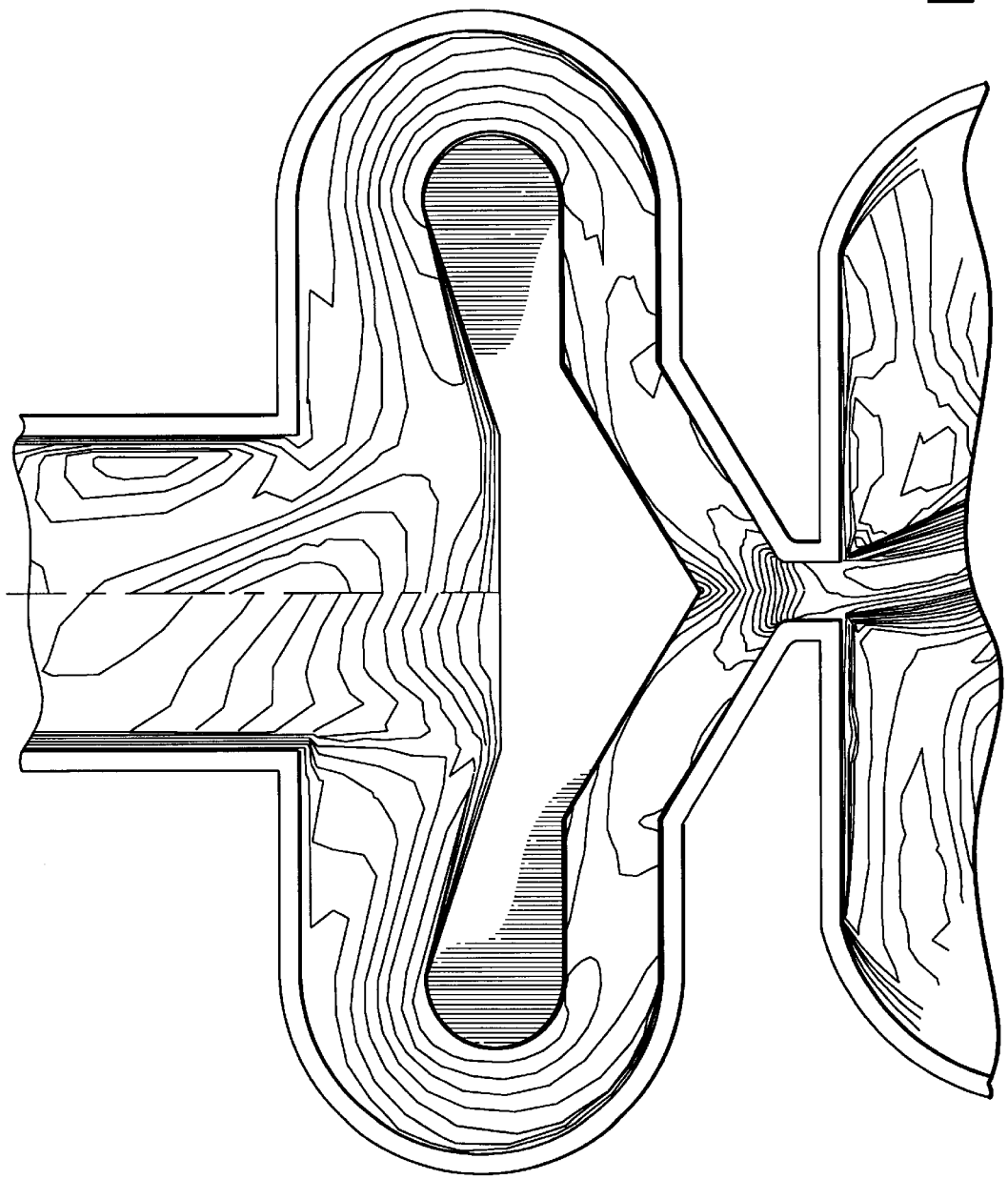
FIG. 10 is a diagrammatic plan view of the flow conditioner shown in FIG. 1 and on which the flow speed distribution field is shown for the situation when the flow at the inlet to the conditioner has a non-uniform speed distribution profile.
Figure 11:
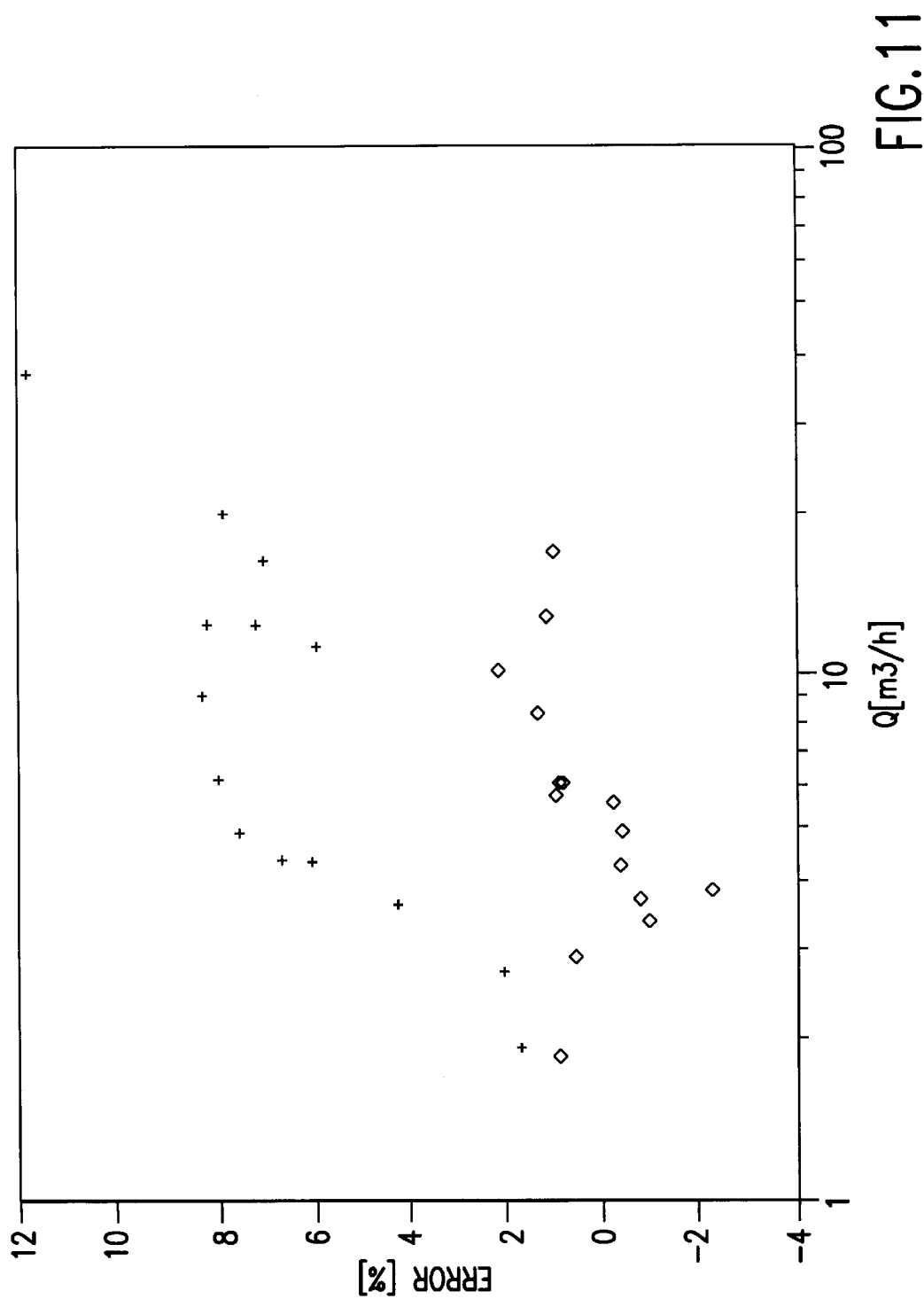
Figure 12:
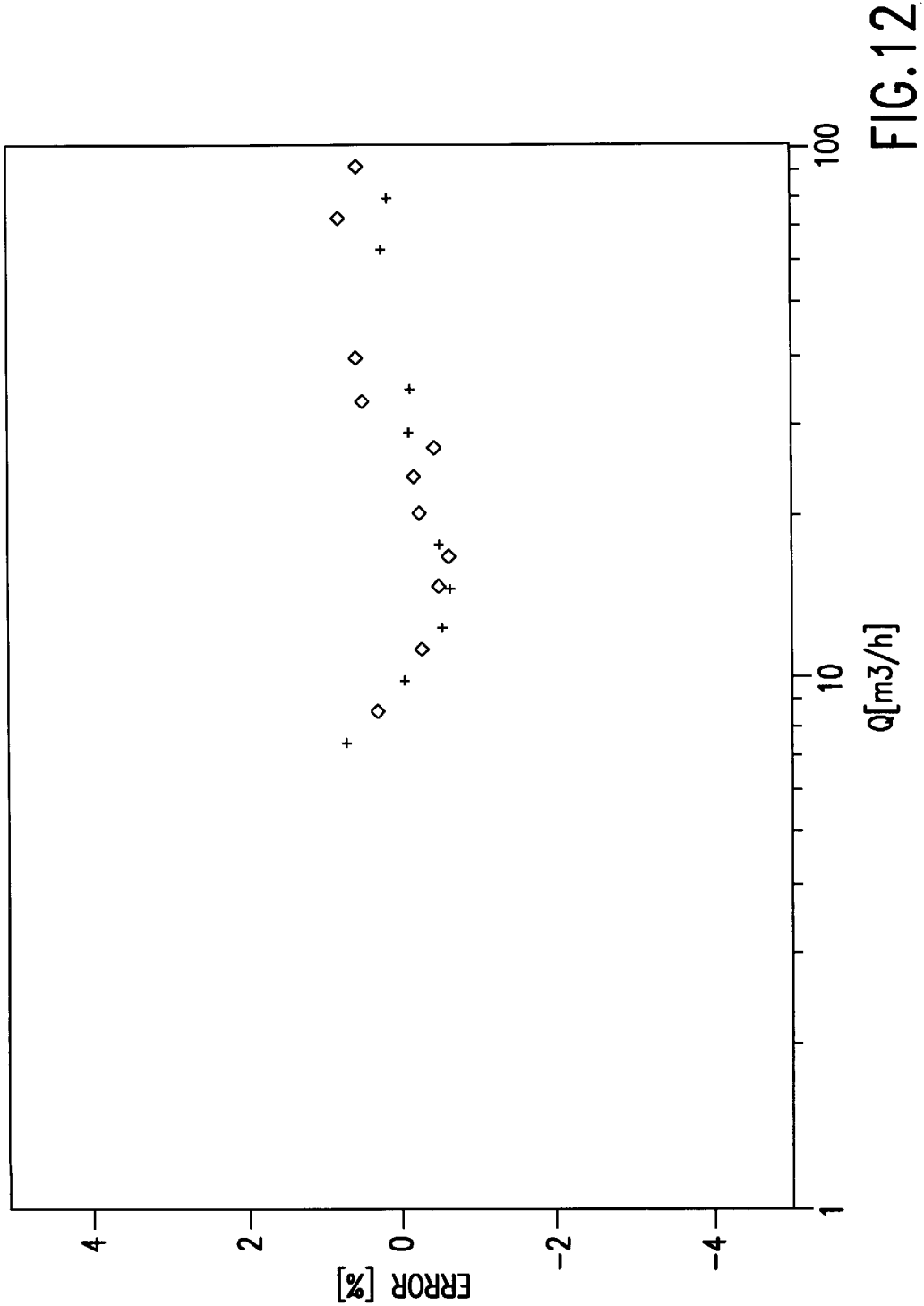

FIG. 11 is a graph showing two calibration curves (◇, +) obtained from a gas meter including a fluidic oscillator as shown in FIG. 2, but without using the flow conditioner of the invention, these curves being obtained respectively when the flow had the profile shown in FIG. 9 and the profile shown in FIG. 10; and FIG. 12 is a graph showing two calibration curves (◇, +) obtained form a gas meter comprising a fluid oscillator as shown in FIG. 2 together with the flow conditioner of the invention, and for the flow profiles shown respectively in FIG. 9 and in FIG. 10.

Figure 1:
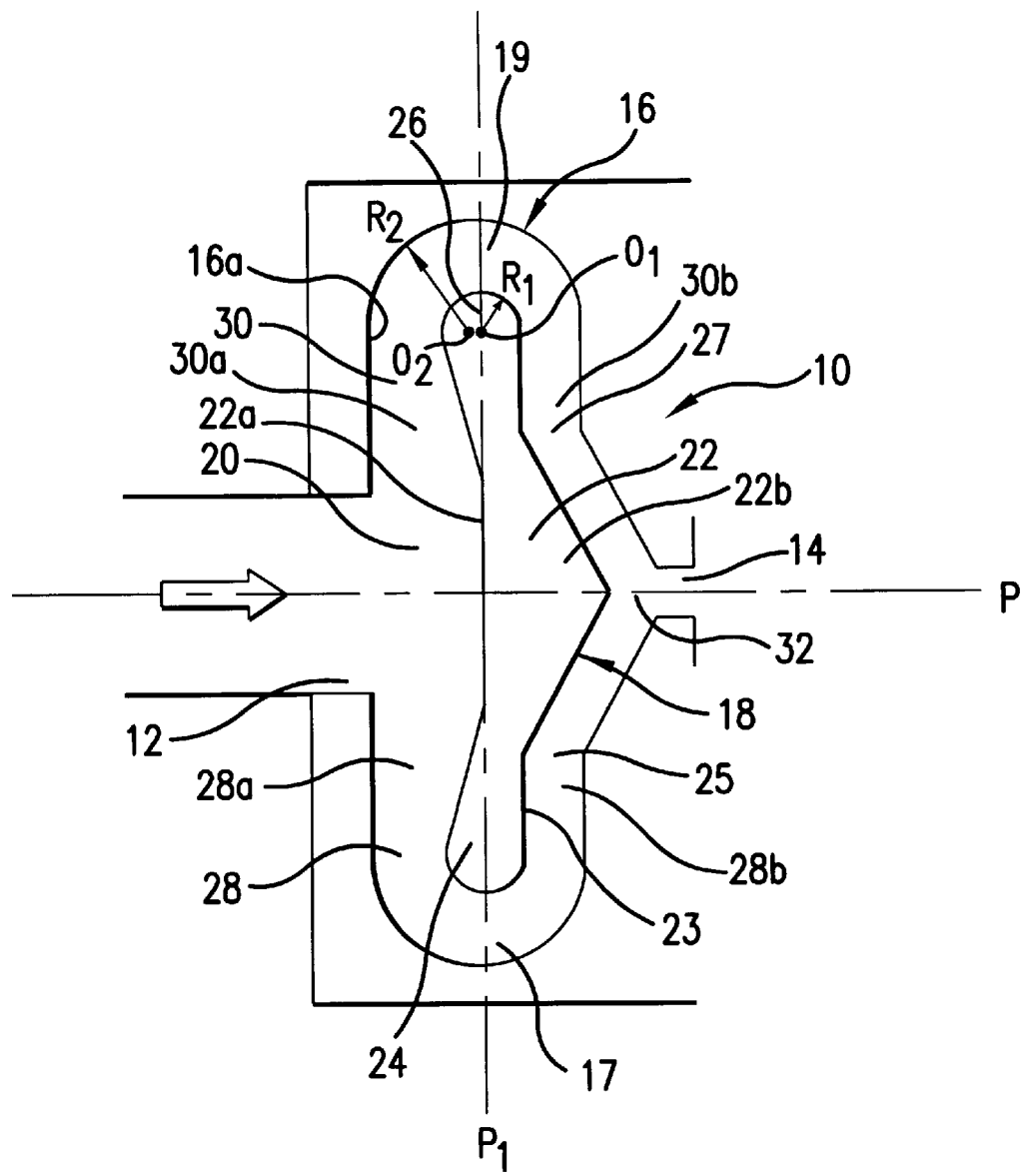
FIG. 1 is a diagrammatic plan view of a flow conditioner constituting a first embodiment of the invention.

As shown in FIGS. 1 and 2, in a first embodiment of the invention, a fluid flow conditioner 10 comprises an inlet 12 and an outlet 14 for said flow. The downstream end of the outlet 14 of the conditioner 10 is connected to a device for determining a volume-related quantity of the fluid and comprising a measurement block 2 in the form of a fluidic oscillator, e.g. as described in French patent application No. 92/05301.

The inlet 12 and the outlet 14 are firstly disposed in a common plane P which is a longitudinal plane of symmetry for the flow conditioner, and secondly they are in alignment on the longitudinal flow direction as defined by the direction that said inlet imparts to said flow and likewise contained in said plane P. The flow section of the inlet 12 imparts axially-symmetrical characteristics to the flow and, by way of example, it is circular in shape, as shown in FIG. 2.

It is also possible to provide an inlet whose flow section imparts a two-dimensional character to the flow and whose shape is rectangular, for example.

The outlet 14 is a slot whose flow section is rectangular in shape and which imparts a two-dimensional character on the flow.

The fluidic oscillator is likewise symmetrical about the plane of symmetry P, thereby making it possible to conserve the characteristics of the fluid flow as conditioned in this way without adding additional disturbances such as those generated by a bend which might be placed between the outlet of the conditioner and the fluidic oscillator.

The conditioner 10 also includes an enclosure 16 connecting the inlet 12 to the outlet 14 together with an obstacle 18 placed in the middle of said enclosure between the inlet and the outlet.

A chamber 20 connected to the inlet 12 is provided inside the enclosure 16 to receive the fluid flow coming from said inlet.

The obstacle 18 is formed by a central body 22 possessing a front surface 22a perpendicular to the longitudinal plane of symmetry P and situated facing the inlet 12 in a transverse plane P1.

In the embodiment shown in FIGS. 1 and 2, the front surface 22a of the obstacle 18 is perpendicular to the longitudinal direction of the flow defined by the inlet 12 and is referred to as an "impact" surface.

This impact surface 22a is plane, but it should nevertheless be observed that said surface may, for example, be slightly concave or convex without thereby disturbing the effectiveness of the flow conditioner 10.

The chamber 20 is defined between the inlet 12 and the front surface 22a of the obstacle 18.

As shown in FIG. 2, the enclosure 16 has an inside surface 16a and the obstacle 18 has an outside surface 23 such that between them, these two surfaces form two symmetrical passages 28 and 30 surrounding said obstacle and putting the chamber 20 into communication with the outlet 14 of the flow conditioner 10.

Figure 2A:
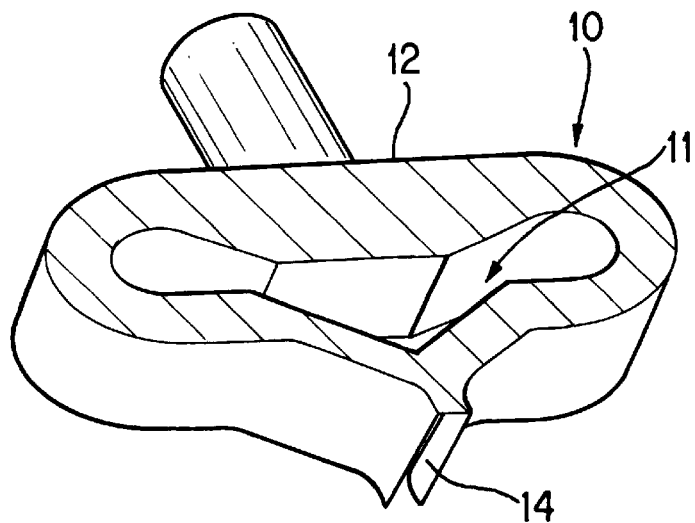
FIG. 2a is a diagrammatic perspective view of the flow conditioner constituting a first variant of the embodiment of the invention shown in FIGS. 1 and 2.

It should be observed that the obstacle 18 is not essential for implementing the invention. As shown in FIG. 2a, it is possible to provide just two passages identical to the passages 28 and 30 of FIGS. 1 and 2 extending between the inlet 12 and the outlet 14 while eliminating the obstacle between said passages. FIG. 2a is a diagrammatic perspective view at the same angle of inclination as FIG. 2 showing such a flow conditioner as seen from the outside, in which the obstacle between the passages has been replaced by an empty space 11.

As shown in FIGS. 1 and 2, the obstacle also has two lateral portions 24 and 26 each of which is in the form of a lobe extending from the central body 22 mainly in a direction extending transversely relative to the plane of symmetry P. Each lobe flares slightly away from the central body 22 and then terminates in an end whose outside surface is convex, e.g. circular in section.

Each lobe-shaped lateral portion 24, 26 of the obstacle 18 co-operates with the facing portion of the enclosure 16 to form a first bend 17, 19 for the flow, with the concave side of the bend facing towards the plane of symmetry P.

Each circularly-shaped convex end of each of the lobe-shaped lateral portions 24, 26 has a radius R1 lying in the range 0.1 to 3.5 times the diameter of the inlet 12 of the conditioner 10, e.g. being equal to 0.45 times the diameter of said inlet (FIG. 1). The portion of the inside surface 16a of the enclosure 16 that forms the concave portion of the first bend 17 or 19 is circular in shape having a radius R2 lying in the range 0.3 to 4 times the diameter of the inlet 12 of the conditioner 10, and is chosen to be equal to 0.35 times said diameter, for example. The above-mentioned circles have respective centers O1 and O2 that are situated on a straight line contained in a plane parallel to the plane of symmetry P and in the plane of FIG. 1. The distance between the two centers serves to select a degree of convergence as desired for the first bend 17 or 19. The distance between O1 and O2 is less than the diameter of the inlet 12 of the conditioner, for example it may be equal to 0.05 times said diameter. It should be observed that the two centers O1 and O2 may coincide.

The central body 22 of the obstacle 18 has a rear portion 22b which cooperates with the facing portion of the enclosure 16 to define a second bend 25 or 27 for the flow with the concave side of the second bend facing the opposite way to that of the first bend 17 or 19. By way of example, the rear portion 22b of the central body 22 of the obstacle 18 may be V-shaped with the tip of the V situated facing the outlet 14 of the flow conditioner.

Each passage 28, 30 has a flow section presented to the flow which decreases from the inlet to said passage going towards the outlet 14 of the flow conditioner, which means that the flow travelling along each of the passages 28 and 30 is accelerated, at least over a portion of said passage.

As shown in FIG. 1, each passage 28, 30 has a converging portion 28a, 30a which is connected directly to the chamber 20 and in which the first bend 17, 19 is situated, with the convergence being greater at the inlet of said passage than in said bend. At the outlet from the first bend 17, 19, each passage includes a portion 28b, 30b of constant flow section disposed between the converging portion 28a, 30a and a "mixing" zone 32 which is situated immediately upstream from the outlet 14 of the conditioner in order to put the two passages 28 and 30 into communication. This portion 28b, 30b begins with a rectilinear length perpendicular to the longitudinal plane of symmetry P and of constant flow section, then said portion forms a sharp second bend 25, 27 and takes up a rectilinear shape of constant flow section going towards said plane P until it meets the mixing zone 32. It is appropriate for the minimum flow section of each passage to be chosen to be not less than the flow section of the outlet 14 of the conditioner, and to be equal to 1.5 times said flow section, for example. This makes it possible to benefit from sufficient flow convergence to obtain a speed distribution at the outlet of the conditioner that is as uniform as possible.

Figure 3:
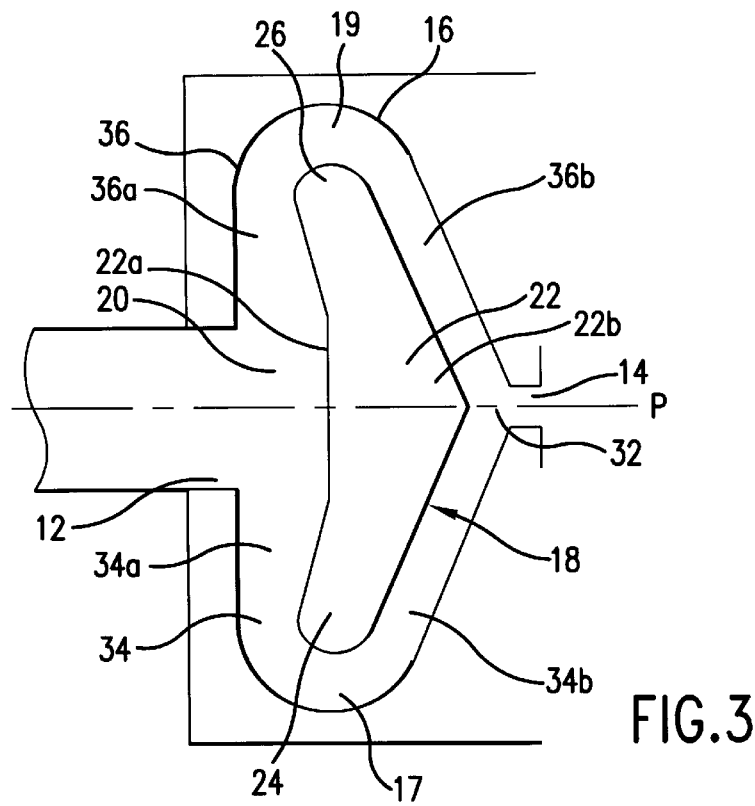
FIG. 3 is a diagrammatic plan view of a flow conditioner constituting a second variant of the embodiment of the invention shown in FIGS. 1 and 2.

In a second variant as shown in FIG. 3 where only the passage references are changed, it is possible to provide only one bend 17, 19 in the conditioner passing through less than 180° so that the last portion 34b, 36b of each of the passages 34, 36 is rectilinear in shape all the way to the mixing zone 32.

Figure 4:
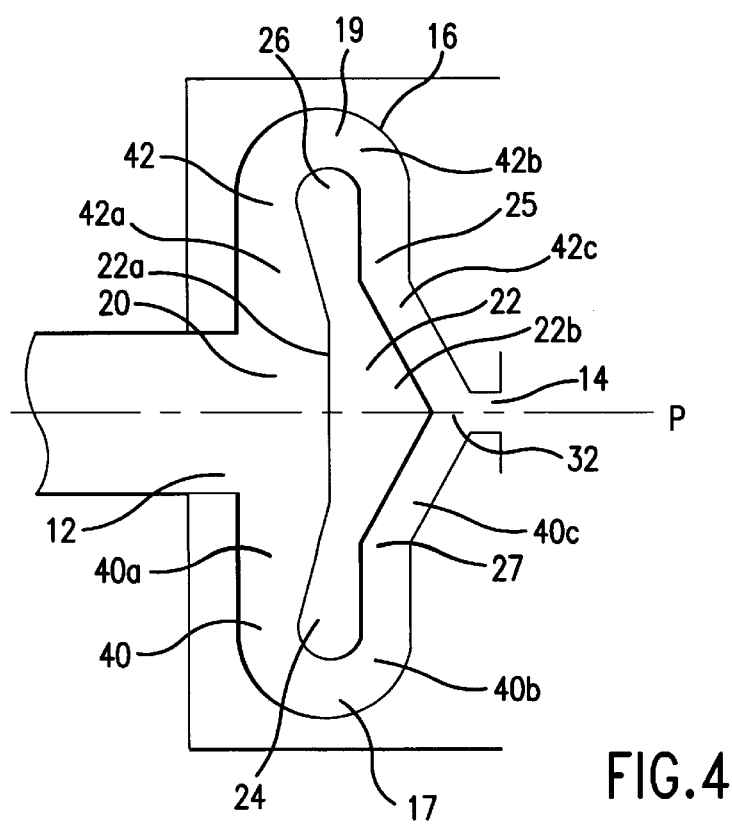
FIG. 4 is a diagrammatic plan view of a flow conditioner constituting a third variant of the embodiment of the invention shown in FIGS. 1 and 2.

FIG. 4 shows a third variant of the embodiment of the conditioner in which only the passage references are changed and in which each passage comprises a converging portion which is not directly connected to the chamber 20. In FIG. 4, each passage 40, 42 comprises a rectilinear first portion 40a, 42a perpendicular to the longitudinal plane of symmetry P and extending from the chamber 20 to the first bend 17, 19. A converging second portion 40b, 42b begins at the inlet of said bend 17, 19 and terminates at the outlet thereof. The third and last portion 40c, 42c of each passage 40, 42 has the same general shape as the second portion 28b, 30b already described with reference to FIG. 1. Nevertheless, in this variant, the dimensions of the flow sections of each passage must be smaller than those of the flow conditioner shown in FIG. 1 in order to enable the conditioner to conserve effectiveness. However, the loss of head induced in this variant embodiment is slightly greater than using the flow conditioner show in FIG. 1. In another variant of the embodiment shown in FIG. 1 (but not shown in the figures), each passage possesses a flow section which tapers continuously along its entire length. In such a configuration, the convergence of the passage at its inlet, i.e. immediately downstream from the chamber 20, is less pronounced than in the conditioner of FIG. 1.

In yet another variant (not shown in the figures), the first bend 17, 19 is not converging in shape and the zone of convergence may be placed either between the chamber 20 and said first bend, or else between the first bend and the outlet of the conditioner, or else in both locations simultaneously.

In order to ensure that the fluid flow has a longitudinal direction from the inlet of the conditioner to the impact surface without oscillating in the chamber 20, it is necessary for the distance between the inlet 12 of said conditioner 10 and the impact surface 22a, and also for. the size of the flow section of each passage 28, 30 relative to the size of said inlet to be selected in appropriate manner.

Thus, the Applicant has observed that by choosing the above-defined distance to be less than four times the inlet diameter and by choosing the smallest flow section of each passage to be less than half the section of the said inlet, the conditioner is particularly effective. It should nevertheless be observed that it is possible to make a flow conditioner by adopting a distance that is greater than that given above providing the minimum flow section of each passage is less than half the inlet section. Conversely, if the minimum flow section of each passage is greater than half the flow section, it is essential for the distance between the inlet and the impact surface to be less than four times the diameter of the inlet 12. By way of example, the distance between the inlet 12 of the conditioner and the impact surface 22a may be equal to 0.65 times the inlet diameter and the smallest flow section of each passage may be equal to 0.3 times the inlet section.

As shown in FIG. 1, the transverse size of the impact surface 22a is equal to the inlet diameter 12 of the flow conditioner, however this size could equally well be greater than said diameter without harming the effectiveness of said conditioner.

The transverse size of the conditioner as described with reference to FIGS. 1 and 2 lies in the range 1.5 to 5 times the flow diameter of the inlet 12, and is equal to 3.65 times said diameter, for example.

The distance between the inlet 12 and the outlet 14 of the conditioner, also referred to as its longitudinal size, lies in the range 1 to 5 times the flow diameter of the inlet 12, e.g. being equal to 1.75 times the diameter.

Thus, the dimensions of a conditioner of the invention provide a conditioner that is compact, making it easy to install between two couplings on a fluid pipe.

Figure 2B:
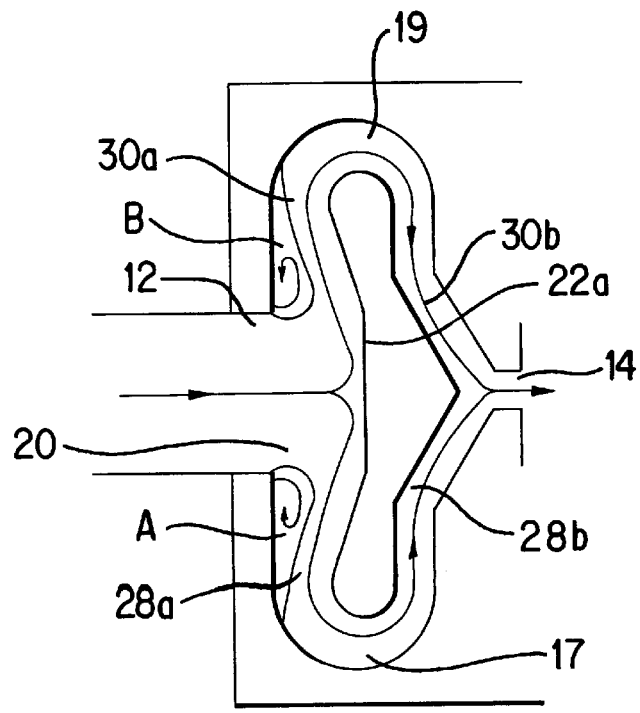
FIG. 2b shows how the flow conditioner of FIG. 1 operates.

The operation of the flow conditioner of the invention is now described with reference to FIG. 2b.

The flow of fluid penetrates into the chamber 20 in a longitudinal direction and on so doing it is subjected to a sudden increase in flow section, thereby giving rise to a symmetrical recirculation phenomenon referenced A, B on either side of the inlet 12 in each of the converging portions 28a and 30a of the passages 28 and 30.

Thereafter, the fluid flow strikes the impact surface 22a perpendicularly thereto and is fractioned on said impact surface, transforming the longitudinal direction of the mean speed of said flow into transverse components. Because momentum is conserved, the flow fractioned in this way will be shared over all of the transverse directions made available thereto, thus breaking up any flow structure that may exist at the inlet of the conditioner.

Because of the configuration and the dimensions of the flow conditioner, it generates a stationary distribution of the fractioned flow which avoids any oscillation of the said flow in the chamber 20.

The two flow fractions travel in substantially symmetrical manner along respective ones of the two converging portions 28a and 30a of the passage 28 and 30 and they also come into contact with the corresponding flow recirculation A or B. The converging portions serve firstly to stabilize the flow recirculation and secondly to make the speed field of the fluid flow more uniform.

Nevertheless, good results can also be obtained without the recirculation phenomenon that occurs only if the inlet section changes suddenly in the flow direction (e.g. at an angle greater than 7°).

Each flow fraction goes round a first bend 17 or 19 and is subsequently channeled towards the mixing zone 32 by the portion 28b or 30b of constant flow section in the corresponding passage 28 or 30.

The dimensions of the mixing zone 30 are small enough to accelerate the flow, thereby increasing its uniformity in the outlet 14 of the flow conditioner 10.

This ensures that the flow characteristics at the outlet 14 of the conditioner 10 are independent of the flow characteristics at its inlet 12.

Figure 5:
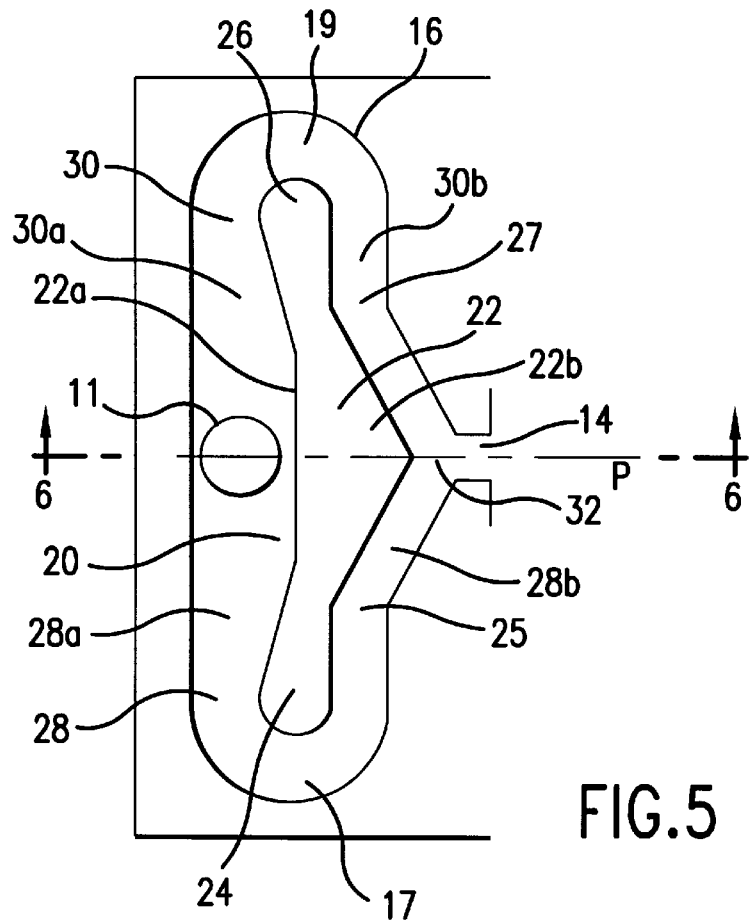
FIG. 5 is a diagrammatic plan view of a flow conditioner constituting a fourth variant of the embodiment of the invention shown in FIGS. 1 and 2.
Figure 6:
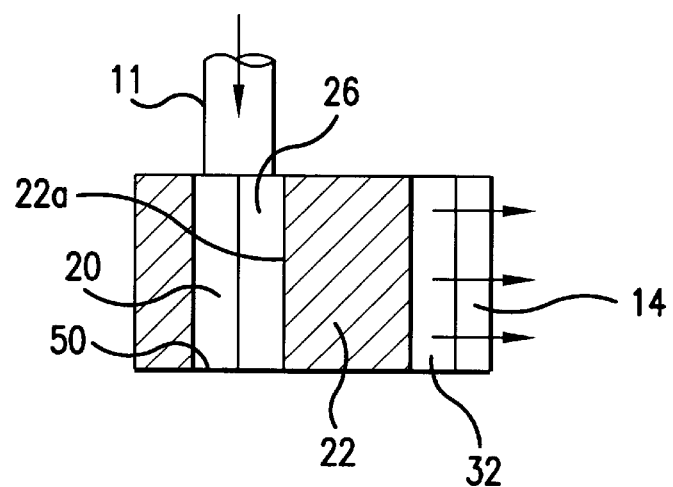
FIG. 6 is a diagrammatic view seen along arrow A of the flow conditioner shown in FIG. 5.

The conditioner of the invention may also be in the form of the variant shown in FIGS. 5 and 6 where only elements that are different are given new references relative to FIGS. 1 and 2. In FIGS. 5 and 6 the inlet 11 and the outlet 14 are offset by 90° in the longitudinal plane of symmetry P. In this variant which differs little from that described with reference to FIGS. 1 and 2, the inlet 11 of the flow conditioner defines a longitudinal direction for the flow opening out into the chamber 20 of the enclosure 16 which is parallel to the direction defined by the front surface 22a of the obstacle 18.

In this configuration, the fluid flow penetrating into the chamber 20 strikes an impact surface 50 situated facing the inlet 11 and perpendicular to the front face 22a of the obstacle 18, which impact surface defines said chamber in part. This variant operates identically to that described above. In FIGS. 5 and 6, the inlet 11 is axially-symmetrical in shape, e.g. circular, while the outlet 14 is in the form of a slot that imparts a two-dimensional character to the flow.

The first embodiment (FIGS. 1 and 2) of the flow conditioner of the invention may also be used upstream from a device for determining a volume-related quantity of a fluid that comprises an ultrasound measuring block. By way of example, such a measuring block comprises a measurement channel of parallelepiped shape, e.g. having a cross-section that is rectangular, with the slot-shaped outlet of said conditioner corresponding to the inlet of said channel. Two ultrasound transducers are mounted on one of the walls of the measurement channel or on two opposite walls of said channel so as to define between them an ultrasound measurement path extending along at least a portion of said measurement channel. International patent application WO 9109282 describes that type of device having an ultrasound measurement block.

Figure 7:
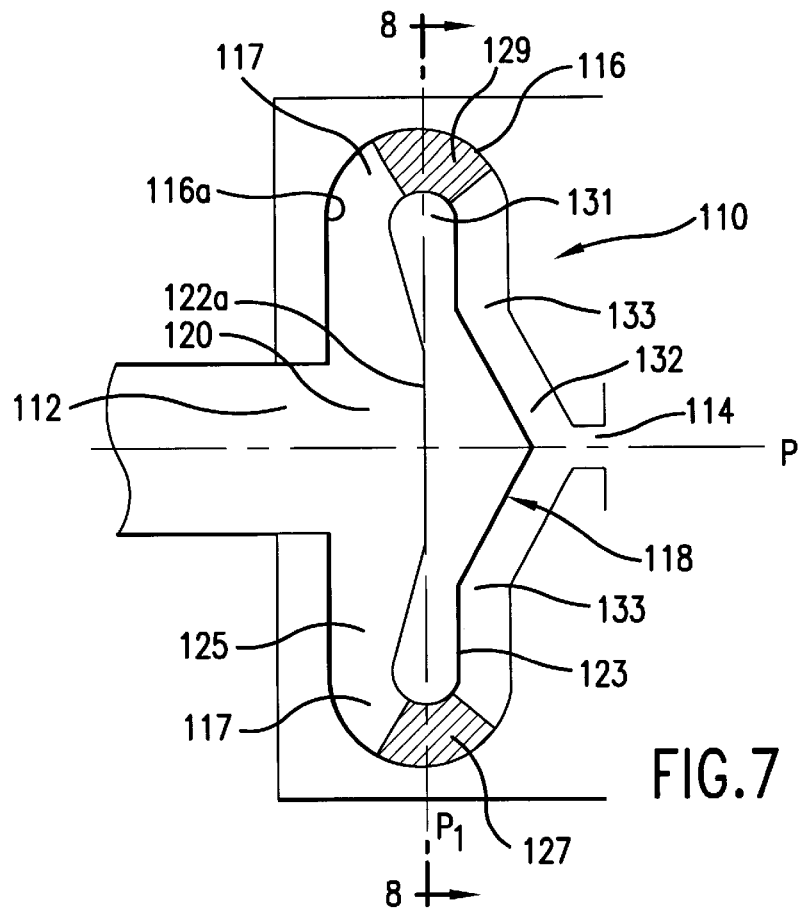
FIG. 7 is a diagrammatic plan view of a flow conditioner constituting a second embodiment of the invention.
Figure 8:
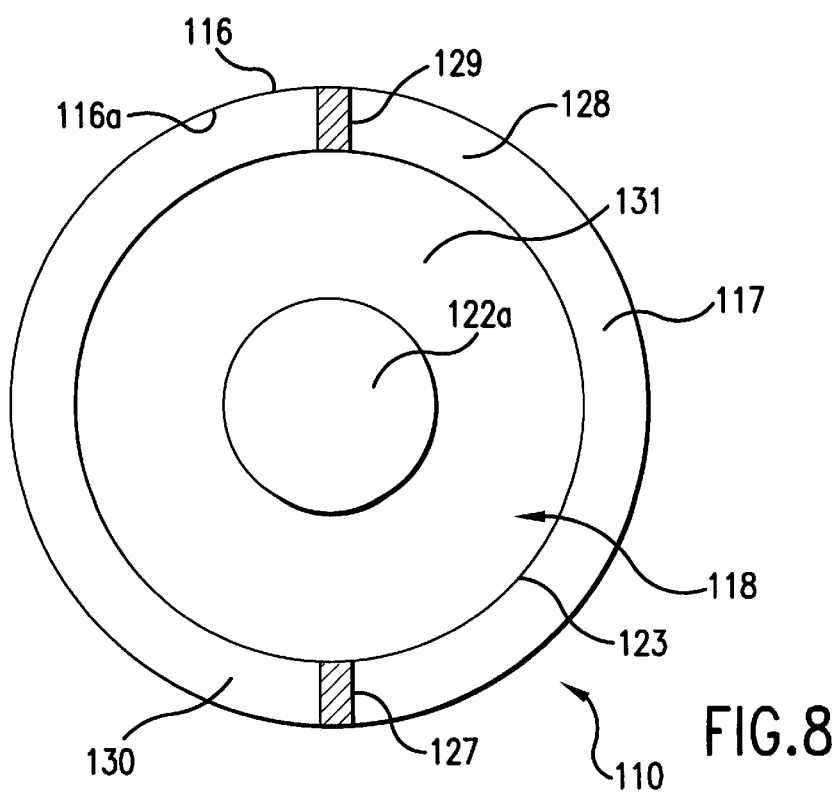
FIG. 8 is a diagrammatic view along arrow B of the flow conditioner shown in FIG. 7.

In a second embodiment of the flow conditioner of the invention as shown in FIGS. 7 and 8, the inlet 112 and the outlet 114 of the flow conditioner 110 are in alignment on the longitudinal flow direction which is defined by the direction said inlet confers on said flow.

The inlet 112 and the outlet 114 are axially-symmetrical in shape, e.g. they are circular. In a manner analogous to that described with reference to FIGS. 1 and 2, the flow conditioner 110 comprises an enclosure 116 connecting the inlet 112 to the outlet 114, and an obstacle 118 disposed in the middle of said enclosure and provided with a front surface 122a forming at least a portion of the impact surface of said conditioner. A chamber 120 connected to the inlet 112 of the conditioner is provided in the enclosure 116 to receive the fluid flow that penetrates therein along the longitudinal direction. The obstacle 118 is constituted by a central body 122 having a front surface 122a perpendicular to the longitudinal plane of symmetry P and situated facing the inlet 112 in a transverse plane P1. The chamber 120 is defined between the inlet 112 and the front surface 122a of the obstacle 118.

In the embodiment shown in FIGS. 7 and 8, the front surface 122a of the obstacle 118 is perpendicular to the longitudinal direction of the flow as defined by the inlet 112. In this second embodiment, the flow conditioner possesses symmetry of revolution about the longitudinal direction of the fluid flow. The enclosure 116 and the obstacle 118 respectively have an inside surface 116a and an outside surface 123 which between them form a single passage surrounding said obstacle.

As shown in FIGS. 7 and 8, two elements 127 and 129 are fixed between the inside surface 116a of the enclosure 116 and the outside surface 123 of the obstacle 118 so as to subdivide the single passage into two passages 128 and 130 of the same dimensions over a fraction of the length of the single passage equal to the length of said elements. These elements 127, 129 may be, for example, in the form of plane plates that are as thin as possible to avoid disturbing the flow and that have their maximum area extending parallel to said flow. It is possible to give the plates 127 and 129 such length and location as may be desired between the two surfaces 116a and 123, but they must nevertheless be disposed immediately downstream from the chamber 120. The flow as fractioned on the impact surface 122a must be spread in substantially identical manner over a common upstream passage portion 125 in all transverse directions open thereto and over a sufficient length prior to being channeled to avoid turbulent structures being propagated towards the downstream end of the conditioner.

More than two elements could be positioned between the inside surface 116a of the enclosure 116 and the outside surface 123 of the obstacle 118 so as to form more than two passages of the same dimensions.

As shown in FIGS. 7 and 8, the obstacle 118 is likewise formed with a peripheral portion 131 that is, for example, in the form of a collar surrounding the central body. Advantageously, the collar 131 co-operates with the facing portion of the enclosure 116 to define a first bend 117 for the fractioned flow and to define a converging portion which is directly connected to the chamber 120 and which includes said bend. The plate-shaped elements 127 and 129 are situated, for example, in the first bend 117 downstream from the common passage portion 125. The central body 122 of the obstacle 118 has a rear portion 122b which co-operates with the facing portion of the enclosure 116 to define a second bend 133 for the fractioned flow. The rear portion 122b of the obstacle 118 may be conical in shape with its tip facing the outlet 114 of the conditioner 110.

Apart from the fact that the fractioned flow passages are not defined immediately downstream from the chamber 120 after fractioning of the flow in the longitudinal direction, but only after a certain length during which the fractioned flow takes a common passage portion 125, the fluid conditioning method of the invention is unaltered compared with that described above.

After the fractioned flow has been channeled in the upstream common passage portion 125 and in the passages 128, 130 defined by the plate-shaped elements 127, 129, said fractioned flow runs into a common downstream passage portion 132 that acts as the mixing zone and whose flow section decreases continuously all the way to the outlet 114, for example.

It should be observed that the length of the plate-shaped elements 127, 129 may be longer than that shown in FIG. 7, thereby reducing the length of the common passage portion 132 to a zone of small size as described with reference to FIGS. 1 and 2 and as given reference 32.

This circularly symmetrical configuration is particularly well adapted to devices for determining a volume-related quantity of a fluid that comprise an ultrasound measurement block implemented in the form of a duct whose own cross-section is axially symmetrical in shape. The measurement duct is fitted with two ultrasound transducers facing each other and at opposite ends of the duct, it being possible, for example, to install one of the transducers in the rear portion of the obstacle 118 of the conditioner in order to avoid disturbing the flow once it has been conditioned.

FIGS. 9 and 10 show speed field distribution in the flow within the flow conditioner shown in FIGS. 1 and 2, thus demonstrating the effectiveness of the flow conditioner.

In FIG. 9, the flow of fluid coming from the inlet 12 is entirely symmetrical about the longitudinal plane of symmetry P and the flow conditioner produces at its outlet 14 a flow that is highly uniform.

The fluid flow at the inlet 12 of the flow conditioner shown in FIG. 10 has been subjected to severe disturbance, given that the portion of the duct situated upstream from said inlet has been obstructed in half so as to reproduce one of the tests laid down by OIML standard R32 (OIML= Organisation Internationale de Métrologie Légale, i.e. the International Organization for Legal Metrology). In spite of this disturbance which gives rise to a high degree of non-uniformity in speed distribution of the flow at the inlet 12 of the conditioner, said flow is distributed in substantially symmetrical manner in each of the passages 28 and 30, and very quickly the two flow fractions become more and more symmetrical to each other as they progress along their respective passages. After the mixing zone 32, the reconstituted flow has a speed distribution which is uniform and which possesses substantially the same characteristics as the flow from the outlet of the conditioner shown in FIG. 9.

Thus, the flow conditioner of the invention produces flow characteristics at its outlet that are independent of the characteristics of the flow at the inlet to said conditioner.

FIGS. 11 and 12 are two graphs, each showing two calibration curves (i.e. curves showing error in air flow rate measurement as a function of flow rate) for a gas meter containing a fluidic oscillator as shown in FIG. 2 and as fed with two different flow profiles as shown for the inlet of the conditioner in FIGS. 9 and 10.

The curve marked by lozenges (◊) was obtained using a flow profile as shown at the inlet of the flow conditioner in FIG. 9. The curve marked by crosses (+) was obtained using a flow profile as shown at the inlet of the flow conditioner in FIG. 10.

FIG. 11 shows the two calibration curves as obtained without a flow conditioner, whereas FIG. 12 shows the curves obtained when using the flow conditioner shown in FIGS. 1 and 2.

When these graphs are compared it can be seen firstly that flow speed profile at the inlet to the fluidic oscillator has an influence on the measurement performed by said fluidic oscillator when the flow conditioner of the invention is not present upstream therefrom, and secondly that the presence of the flow conditioner upstream from the fluidic oscillator makes it insensitive to disturbances in the flow upstream from the conditioner.

We claim:

1. A method of conditioning a fluid flow from a first zone towards a second zone situated downstream from said first zone, said method comprising the steps of:

directing said flow coming from the first zone into a longitudinal direction;

subjecting said flow to an increase in flow section;

fractioning said flow on an "impact" surface extending substantially transversely to the longitudinal direction of the flow;

channeling the fractioned flow symmetrically about the longitudinal direction of the flow over a determined length from the fractioning location to the second zone, and without slowing the flow down;

accelerating said fractioned flow over at least a portion of said determined length; and mixing the flow in order to obtain a conditioned fluid flow in the second zone.

2. A method according to claim 1, consisting in accelerating the flow immediately downstream from the fractioning zone.

3. A method according to claim 1, consisting in subjecting said flow to a sudden increase in flow section, thereby generating a fluid flow recirculation phenomenon at said increase in flow section.

4. A method according to claim 1, in which the channeling step consists, in particular, in causing the fractioned flow to pass round a bend situated downstream from the fractioning zone.

5. A method according to claim 1, consisting in accelerating the flow during the mixing step.

6. A fluid flow conditioner comprising an inlet and an outlet for the fluid flow, said conditioner being symmetrical about a longitudinal plane of symmetry P in which said inlet and outlet are contained, and said conditioner comprising:

a chamber connected to said inlet and partially defined by an impact surface extending in a direction substantially contained in a transverse plane and against which the flow is fractioned, said impact surface being situated facing said inlet;

channeling means for channeling the fractioned flow symmetrically to the outlet of the conditioner and including at least two passages for bringing the fractioned flow to a mixing zone for the fractioned flow situated immediately upstream from said outlet, said channeling means comprising at least one converging portion and not slowing down the flow; and the distance between the inlet of the conditioner and the impact surface, and the size of the section offered to the flow in the channeling means compared with the size of the inlet section of the conditioner being selected in such a manner that the fluid flow has a longitudinal direction until it meets said impact surface and does not oscillate in the chamber.

7. A conditioner according to claim 6, in which the distance between the inlet of the conditioner and the impact surface is less than four times the diameter of said inlet, and the minimum flow section of the channeling means is less than the section of said inlet.

8. A conditioner according to claim 6, in which the minimum flow section of the channeling means is equal to at least twice the flow section of the outlet of said conditioner.

9. A conditioner according to claim 6, having a dimension between the inlet and the outlet of said conditioner lying in the range one to five times the flow diameter of the inlet of the conditioner.

10. A conditioner according to claim 6, having a transverse dimension lying in the range 1.5 to 5 times the flow diameter of the inlet of the conditioner.

11. A conditioner according to claim 6, in which the converging portion is directly related to the chamber.

12. A conditioner according to claim 6, in which the channeling means include a converging portion which is not directly connected to the chamber.

13. A conditioner according to claim 11, in which the channeling means include a portion of constant flow section disposed downstream from the converging portion.

14. A conditioner according to claim 6, in which the channeling means for the fraction flow include at least one bend.

15. A conditioner according to claim 6, in which the chamber presents the fluid flow coming from the inlet with a sudden increase in flow section.

16. A conditioner according to claim 6, comprising an enclosure interconnecting the inlet and the outlet of said conditioner, and an obstacle disposed in the middle of said enclosure.

17. A conditioner according to claim 16, in which the obstacle is provided with a front surface which forms at least a part of the impact surface of said conditioner.

18. A conditioner according to claim 6, in which the inlet and the outlet of said conditioner are in alignment.

19. A conditioner according to claim 16, in which the enclosure and the obstacle respectively present an inside surface and an outside surface forming between them two lateral passages surrounding said obstacle.

20. A conditioner according to claim 19, in which the obstacle is formed by a central body and two lateral portions extending from said central body mainly in a direction that is transverse to the longitudinal plane of symmetry P.

21. A conditioner according to claim 20, in which each lateral portion co-operates with the facing portion of the enclosure to define a first bend for the corresponding flow fraction, and also a converging portion that is directly connected to the chamber and that includes said bend.

22. A conditioner according to claim 20, in which each lateral portion is in the form of a lobe.

23. A conditioner according to claim 20, in which each lateral portion is flared in shape going away from the central body and terminates in an end having an outside surface that is convex.

24. A conditioner according to claim 23, in which the convex outside surface has a profile that is circular in shape of radius R1 lying in the range 0.1 to 3.5 times the diameter of the inlet of the conditioner.

25. A conditioner according to claim 23, in which the portion of the enclosure facing the convex outside surface of each lateral portion has an inside surface that is concave.

26. A conditioner according to claim 24, in which the concave inside surface has a profile of circular shape with radius R2 lying in the range 0.3 to 4 times the diameter of the inlet of the conditioner.

27. A conditioner according to claim 26, in which the circles of respective radii R1 and R2 have respective centers O1 and O2, said centers O1 and O2 being situated on a straight line parallel to the longitudinal plane of symmetry P and perpendicular to the front surface of the obstacle, and being spaced apart from each other by a distance that is less than the diameter of the inlet of the conditioner.

28. A conditioner according to claim 21, in which the central body has a rear portion which co-operates with the facing portion of the enclosure to define a second bend for the corresponding flow fraction.

29. A conditioner according to claim 28, in which the rear portion is V-shaped.

30. A conditioner according to claim 6, that is circularly symmetrical about the longitudinal direction of the fluid flow and in which the enclosure and the obstacle respectively present an inside surface and an outside surface which together form a single passage surrounding said obstacle, at least two elements being disposed between said surfaces at a certain distance from the inlet in order to separate a portion of said passage into two passages of the same dimensions.

31. A device for determining a volume-related quantity of a flowing fluid, the device comprising a measurement block and a fluid flow conditioner comprising an inlet and an outlet for the fluid flow, said conditioner being symmetrical about a longitudinal plane of symmetry P in which said inlet and outlet are contained, and said conditioner comprising:

a chamber connected to said inlet and partially defined by an impact surface extending in a direction substantially contained in a transverse plane and against which the flow is fractioned, said impact surface being situated facing said inlet;

channeling means for channeling the fractioned flow symmetrically to the outlet of the conditioner and including at least two passages for bringing the fractioned flow to a mixing zone for the fractioned flow situated immediately upstream from said outlet, said channeling means comprising at least one converging portion and not slowing down the flow; and the distance between the inlet of the conditioner and the impact surface, and the size of the section offered to the flow in the channeling means compared with the size of the inlet section of the conditioner being selected in such a manner that the fluid flow has a longitudinal direction until it meets said impact surface and does not oscillate in the chamber, said fluid flow conditioner being disposed upstream from said measurement block in the fluid flow direction, said measurement block being in alignment with said fluid flow conditioner.

32. A device according to claim 31, in which the measurement block is a fluidic oscillator.

33. A device according to claim 31, characterized in that the measurement block comprises at least one measurement channel in the form of a parallelepiped and at least two ultrasound transducers defining an ultrasound measurement path between them extending along at least a portion of the measurement channel.

* * * * *